US012786023B2

(12) United States Patent
Ranzani et al.

(10) Patent No.: US 12,786,023 B2
(45) Date of Patent: Nov. 3, 2026

(54) MULTI-TONE MODULATED ANTENNA

(71) Applicants: RTX BBN Technologies, Inc., Cambridge, MA (US); Research Foundation of the City University of New York, New York, NY (US); Wayne State University, Detroit, MI (US)

(72) Inventors: Leonardo Matteo Ranzani, Acton, MA (US); Brian Michael Hassick, Bedford, NH (US); Martin Gustafsson, Cambridge, MA (US); Andrea Alu, New York, NY (US); Dimitrios Sounas, Detroit, MI (US); Ahmed Mekawy, New York, NY (US); Paul Xu, New York, NY (US); Akshaj Arora, New York, NY (US); Yoshiaki Kasahara, New York, NY (US)

(73) Assignees: RTX BBN TECHNOLOGIES, INC., Cambridge, MA (US); RESEARCH FOUNDATION OF THE CITY UNIVERSITY OF NEW YORK, New York, NY (US); WAYNE STATE UNIVERSITY, Detroit, MI (US)

( * ) Notice: Subject to any disclaimer, the term of this patent is extended or adjusted under 35 U.S.C. 154(b) by 32 days.

(21) Appl. No.: 19/079,704

(22) Filed: Mar. 14, 2025

(65) Prior Publication Data

US 2026/0039519 A1 Feb. 5, 2026

Related U.S. Application Data

(60) Provisional application No. 63/647,215, filed on May 14, 2024.

(51) Int. Cl.
*H03K 7/04* (2006.01)
*H01Q 1/27* (2006.01)
(Continued)

(52) U.S. Cl.
CPC ............... *H04L 27/12* (2013.01); *H01Q 1/27* (2013.01); *H01Q 7/00* (2013.01)

(58) Field of Classification Search
CPC ............. H04L 27/12; H01Q 1/27; H01Q 7/00
(Continued)

(56) References Cited

U.S. PATENT DOCUMENTS 3,130,322 A 4/1964 Ctirad
3,248,557 A 4/1966 Dickens
(Continued)

FOREIGN PATENT DOCUMENTS

KR 20090067896 A 6/2009

OTHER PUBLICATIONS

International Search Report with Written Opinion issued in International Application No. PCT/US2025/020005; Date of Mailing Nov. 6, 2025 (16 pages).
(Continued)

*Primary Examiner* — Zewdu A Kassa
(74) *Attorney, Agent, or Firm* — CANTOR COLBURN LLP

(57) ABSTRACT

An antenna assembly performs a method for operating an electrically small antenna (ESA). The antenna assembly includes a drive circuit for operating the ESA. The drive circuit includes a resonator having a first resonant frequency, a variable coupling element that controls an electrical connection between the drive circuit and the ESA, a first modulator that modulates the variable coupling element at a first tonal frequency, and a second modulator configured to modulate the variable coupling element at a second tonal frequency. The first tonal frequency is a sum of the first resonant frequency and a second resonant frequency of the ESA. The second tonal frequency is a difference between the first resonant frequency and the second resonant frequency.

20 Claims, 8 Drawing Sheets

(51) Int. Cl.
*H01Q 7/00* (2006.01)
*H04L 27/12* (2006.01)

(58) Field of Classification Search
USPC .......................... 375/239, 230, 219, 295, 316
See application file for complete search history.

(56) References Cited

U.S. PATENT DOCUMENTS

| | | | | |
|---|---|---|---|---|
| 4,158,817 | A | 6/1979 | Locherer | |
| 10,804,583 | B2 | 10/2020 | Kord et al. | |
| 2016/0294056 | A1 * | 10/2016 | Manteghi ................ | H04L 27/12 |

OTHER PUBLICATIONS

Loghmannia et al. "Broadband parametric impedance matching for small antennas using the Bode-Fano limit: Improving on Chu's limit for loaded small antennas" IEEE Antennas and Propagation Magazine 64.5 (Jul. 2021) pp. 55-68.

Mekawy et al. "Parametric enhancement of radiation from electrically small antennas" Physical Review Applied 15.5 (May 2021) 054063: 12 pages.

Santos et al. "High efficiency bandwidth VHF electrically small antennas through direct antenna modulation" IEEE Transactions on Microwave Theory and Techniques 68.12 (August 2020) pp. 5029-5041.

Wolff "High-speed frequency-shift keying of LF and VLF radio circuits" IRE Transactions on Communications Systems 5.3 (Dec. 1957) pp. 29-42.

* cited by examiner $$d^2 - g^2 < \frac{K_r K_{ESA}}{4}$$

$$d^2 - g^2 = \frac{K_r K_{ESA}}{4}$$

$$d^2 - g^2 > \frac{K_r K_{ESA}}{4}$$

MULTI-TONE MODULATED ANTENNA

CROSS REFERENCE TO RELATED APPLICATIONS

This application claims the benefit of U.S. Provisional Application No. 63/647,215 filed May 14, 2024, the disclosure of which is incorporated herein by reference in its entirety.

GOVERNMENT LICENSE RIGHTS

This disclosure was made with Government support under N66001-22-C-4501 awarded by IARPA, Intelligence Advanced Research Projects Activity. The Government has certain rights in the disclosure.

BACKGROUND

The present disclosure relates to electrically small antennas (ESAs) and, more specifically, to a system and method for operating an ESA as a dual tone modulated antenna.

Electrically small antennas (ESAs) are significantly shorter than the wavelength of the signals it is designed for. An ESA typically takes the form of a small loop or patch and is therefore advantageous to use when space is at a premium. Due to the fundamental tradeoff between antenna size (i.e., antenna radius), antenna wavelength and antenna bandwidth, ESAs are typically narrow band antennas. This tradeoff limits a communication data rate for the ESA, especially in a range of high frequency (HF) (about 30 MHz to about 300 MHz) and very high frequency (VHF) (about 300 MHz to about 3000 MHz). For various uses, it is desirable to have antennas as small as possible. Therefore, there is a need to operate an ESA that maintains a suitable communication bandwidth and efficiency.

SUMMARY

According to one embodiment, an antenna assembly is disclosed. The antenna assembly includes an electrically small antenna (ESA), a drive circuit for operating the ESA, the drive circuit including a resonator having a first resonant frequency, a variable coupling element that controls an electrical connection between the drive circuit and the ESA, a first modulator configured to modulate the variable coupling element at a first tonal frequency, wherein the first tonal frequency is a sum of the first resonant frequency and a second resonant frequency of the ESA, and a second modulator configured to modulate the variable coupling element at a second tonal frequency, wherein the second tonal frequency is a difference between the first resonant frequency and the second resonant frequency.

According to another embodiment, a device is disclosed. The device includes an electrically small antenna (ESA), a drive circuit for operating the ESA, the drive circuit including a resonator having a first resonant frequency, a variable coupling element that controls an electrical connection between the drive circuit and the ESA, a first modulator configured to modulate the variable coupling element at a first tonal frequency, wherein the first tonal frequency is a sum of the first resonant frequency and a second resonant frequency of the ESA, and a second modulator configured to modulate the variable coupling element at a second tonal frequency, wherein the second tonal frequency is a difference between the first resonant frequency and the second resonant frequency.

According to another embodiment, a method of operating an electrically small antenna is disclosed. The method includes controlling an electrical connection between the electrically small antenna and a drive circuit via a variable coupling element, the drive circuit including a resonator having a first resonant frequency. Controlling the electrical connection includes modulating the variable coupling element at a first tonal frequency via a first modulator, wherein the first tonal frequency is a sum of the first resonant frequency and a second resonant frequency of the ESA and modulating the variable coupling element at a second tonal frequency via a second modulator, wherein the second tonal frequency is a difference the first resonant frequency and the second resonant frequency of the ESA.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
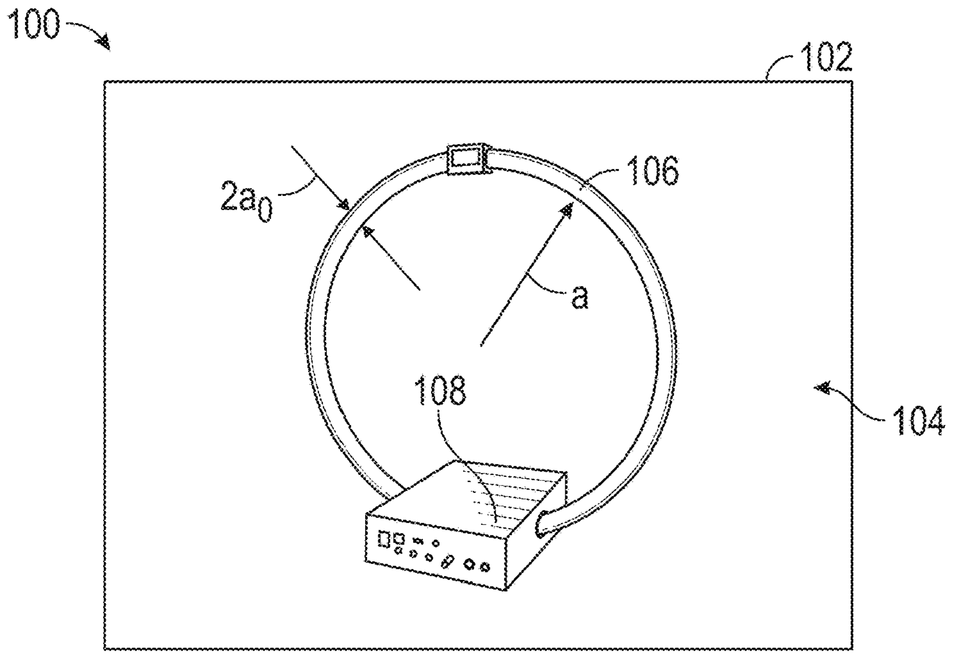
FIG. 1 depicts a system in an illustrative embodiment.

FIG. 1 depicts a system 100 in an illustrative embodiment. The system 100 can be an aerial vehicle or aerial device, such as an unmanned aerial vehicle, a guided missile, a satellite orbiting the Earth, etc. The system 100 includes a communication device 102 for communicating (i.e., transmitting and/or receiving) data which can be used for operating the system. The communication device 102 includes an antenna assembly 104 having an electrically small antenna (ESA 106) and a drive circuit 108 that sends and/or receives the data via the ESA 106. An ESA 106 is an antenna that is significantly shorter than the wavelength of the signals which are communication over it. The ESA 106 shown in FIG. 1 is in the form of a loop having a radius a and a loop thickness of $2a_0$. However, this antenna design is not meant to be a limitation of the system.

Figure 2:
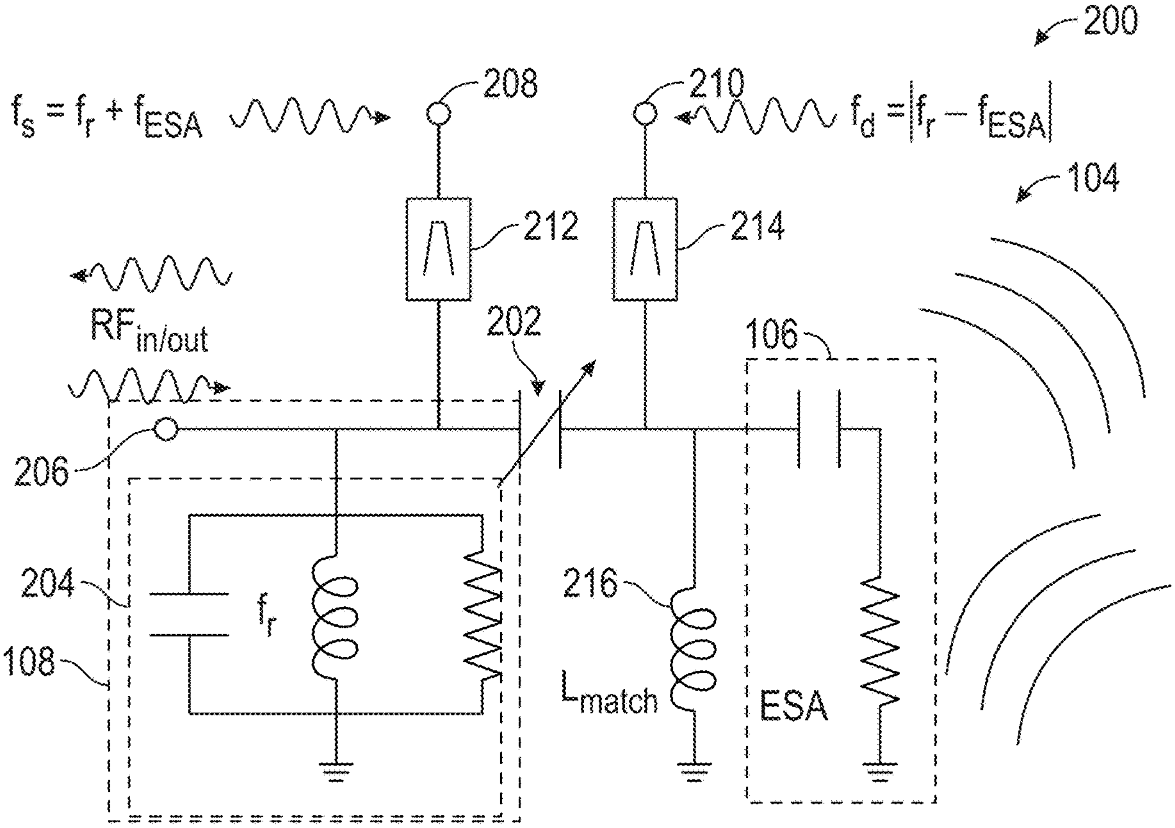
FIG. 2 is a diagram of the antenna assembly of FIG. 1, in an illustrative embodiment.

FIG. 2 is a diagram 200 of the antenna assembly 104 of FIG. 1, in an illustrative embodiment. The antenna assembly 104 includes the electrically small antenna (ESA 106) and the drive circuit 108. The ESA 106 and the drive circuit 108 are electrically connected via a variable coupling element 202. In an embodiment, the variable coupling element 202 can be a variable capacitor, such as a semiconductor-based variable capacitor. The drive circuit 108 includes a resonator 204 and an RF electrical signal input/output device (I/O device 206). The resonator 204 can be an RLC circuit, such as the RLC circuit shown in FIG. 1, with a resistor, capacitor and inductor connected in parallel with each other. The resonator 204 has a first resonant frequency $f_r$. The ESA 106 has a second resonant frequency $f_{ESA}$. A matching inductor 216 is coupled to the ESA 106.

A first modulator 208 and a second modulator 210 provide signals for controlling operation of the variable coupling element 202. The first modulator 208 is coupled to the variable coupling element 202 via a first filter 212 and the second modulator is coupled to the variable coupling element 202 via a second filter 214. The first modulator 208 is shown on the same side of the variable coupling element 202 as the drive circuit 108 and the second modulator 210 is shown on the same side of the variable coupling element 202 as the ESA 106. However, this is not meant as a limitation of the antenna assembly 104.

The first modulator 208 drives the variable coupling element 202 using a first tonal signal. The first tonal signal operates at a first tonal frequency $f_s$. The first tonal frequency $f_s$ is a summation of the first resonant frequency $f_r$ and the second resonant frequency $f_{ESA}$, as shown in Eq. (1):

$$f_s = f_r + f_{ESA} \qquad \text{Eq. (1)}$$

The second modulator 210 drives the variable coupling element 202 using a second tonal signal. The second tonal signal operates at a second tonal frequency $f_d$. The second tonal frequency $f_d$ is a difference of the first resonant frequency $f_r$ and the second resonant frequency $f_{ESA}$, as shown in Eq. (2):

$$f_d = |f_r - f_{ESA}| \qquad \text{Eq. (2)}$$

Figure 3:
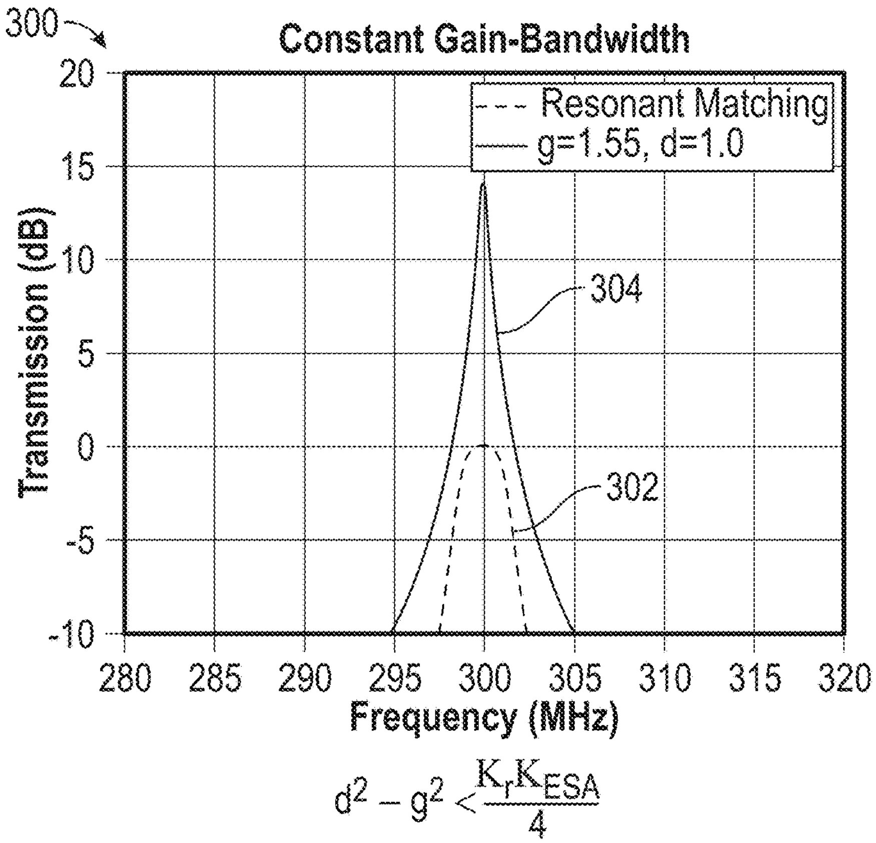
FIG. 3 shows a graph illustrating bandwidth for the antenna assembly when operating in a constant gain-bandwidth product mode of operation.
Figure 4:
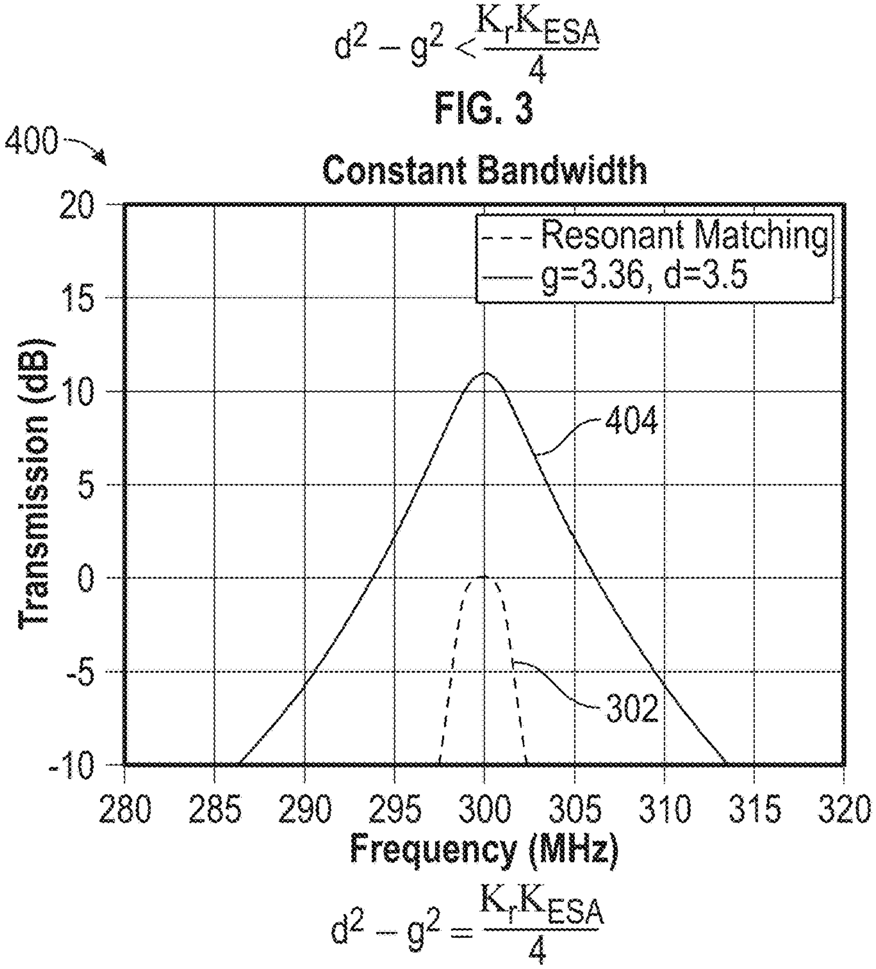
FIG. 4 shows a graph illustrating bandwidth for the antenna assembly when operating in a constant bandwidth mode of operation.
Figure 5:
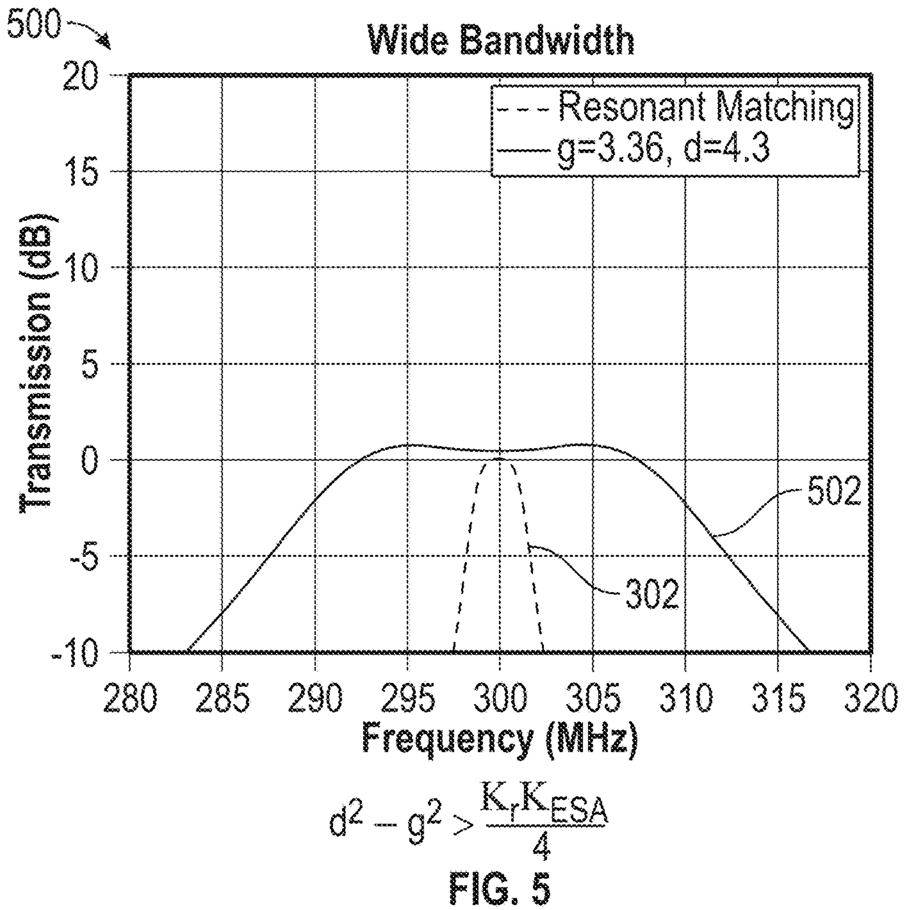
FIG. 5 shows a graph illustrating bandwidth for the antenna assembly when operating in a wide bandwidth mode of operation.

The bandwidth and gain of the antenna assembly can be controlled by controlling the amplitude or magnitude of the first tonal signal and the second tonal signal, as shown in FIGS. 3-5.

FIG. 3 shows a graph 300 illustrating bandwidth for the antenna assembly 104 when operating in a constant gain-bandwidth product mode of operation. Frequency is shown in Megahertz (MHz) along the abscissa and transmission power is shown in decibels (dB) along the ordinate axis. The antenna assembly is operated under the condition of Eq. (3):

$$d^2 - g^2 < \frac{\kappa_r \kappa_{ESA}}{4} \qquad \text{Eq. (3)}$$

where d is the amplitude of the difference signal (i.e., the second tonal signal), g is the amplitude of the summation signal (i.e., the first tonal signal), $k_r$ is the linewidth of the resonator 204, and $k_{ESA}$ is the linewidth of the ESA 106.

A resonant matching gain curve 302 shows bandwidth for the antenna assembly 104 operated in resonant matching (i.e., by using a static matching network without modulating tones). The maximum transmission is 0 decibels at 300 MHz. The resonant matching gain curve 302 extends from about 298 MHz to about 302 MHz at −10 dB. With d held constant, as g increases, the maximum transmission power can be increased without significantly increasing the bandwidth. For example, at d=1 and g=1.55, gain curve 304 has a maximum transmission power at about 14 dB at 300 MHz and extends from about 295 MHz to about 305 MHz at −10 dB.

FIG. 4 shows a graph 400 illustrating bandwidth for the antenna assembly 104 when operating in a constant bandwidth mode of operation. Frequency is shown in Megahertz (MHz) along the abscissa and transmission power is shown in decibels (dB) along the ordinate axis. The antenna assembly is operated under the condition of Eq. (4):

$$d^2 - g^2 = \frac{\kappa_r \kappa_{ESA}}{4} \qquad \text{Eq. (4)}$$

The resonant matching gain curve 302 is shown. Both g and d can be adjusted simultaneously. In general, g and d are either increasing together or decreasing together to satisfy Eq. (4). Gain curve 402 shows bandwidth for the antenna assembly operating with d=3.5 and g=3.36. The maximum transmission power is at about 11 dB at 300 MHz and extends from about 287 MHz to about 313 MHz at −10 dB, which is increased over the bandwidth of the resonant matching gain curve 302. Furthermore, perfect impedance match (zero return loss) is obtained in this mode of operation.

FIG. 5 shows a graph 500 illustrating bandwidth for the antenna assembly 104 when operating in a wide bandwidth mode of operation. Frequency is shown in Megahertz (MHz) along the abscissa and transmission power is shown in decibels (dB) along the ordinate axis. The antenna assembly is operated under the condition of Eq. (4):

$$d^2 - g^2 > \frac{\kappa_r \kappa_{ESA}}{4} \qquad \text{Eq. (5)}$$

The resonant matching gain curve 302 is shown. Both g and d can be adjusted simultaneously. In general, g and d are either increasing together or decreasing together to satisfy Eq. (5). Gain curve 502 shows bandwidth for the antenna assembly operating with d=4.3 and g=3.36. The maximum transmission power is relatively unchanged (at about 0 dB at 300 MHz). However, the bandwidth has increased and extends from about 283 MHz to about 317 MHz at −10 dB.

The antenna assembly 104 can be operated in either of the modes of FIGS. 3-5 based on a desired application of the system 100. For example, the antenna assembly 104 can be operated in the wide bandwidth mode to scan a particular area, as shown in FIG. 5. If there is an object of interest, the antenna assembly can be switched to operate in the constant gain-bandwidth product mode as shown in FIG. 3 to focus on the object while filtering out out-of-band noise.

Figure 6:
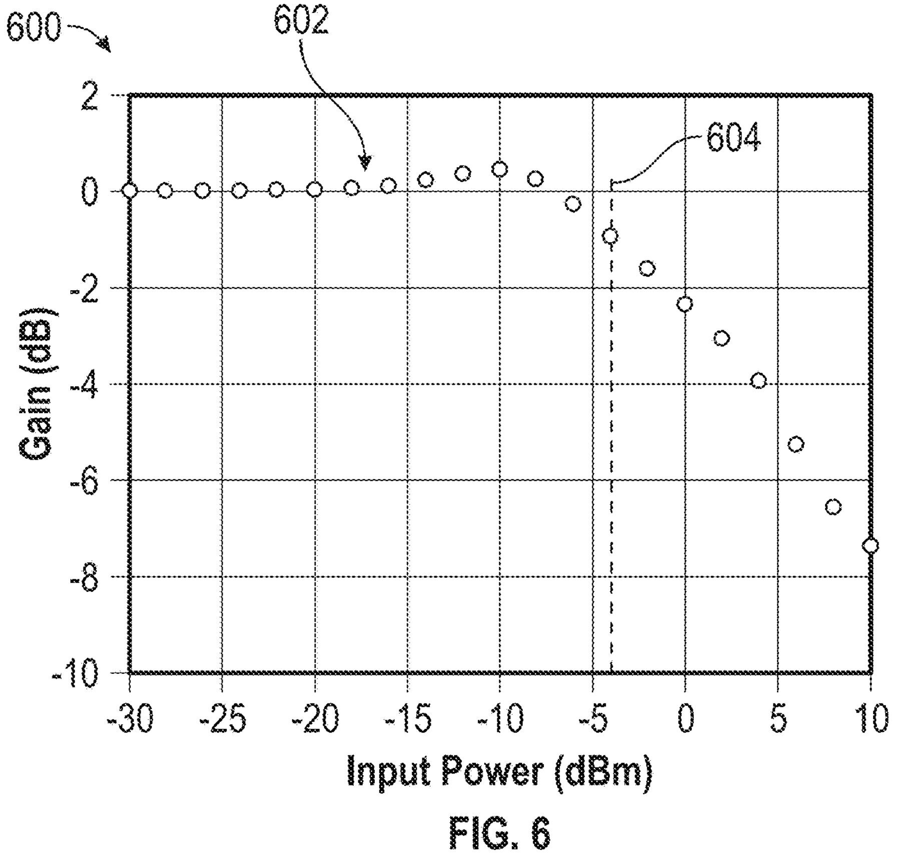
FIG. 6 shows a graph of antenna gain and saturation power for an illustrative antenna assembly.

FIG. 6 shows a graph 600 of antenna gain for an illustrative antenna assembly. Input power is shown in decibelmeters (dBm) along the abscissa and gain is shown in decibels (dB) along the ordinate axis. The gain curve 602 is generally constant below an input power threshold 604 (e.g., about −4 dBm), above which the signal experiences compression.

Figure 7:
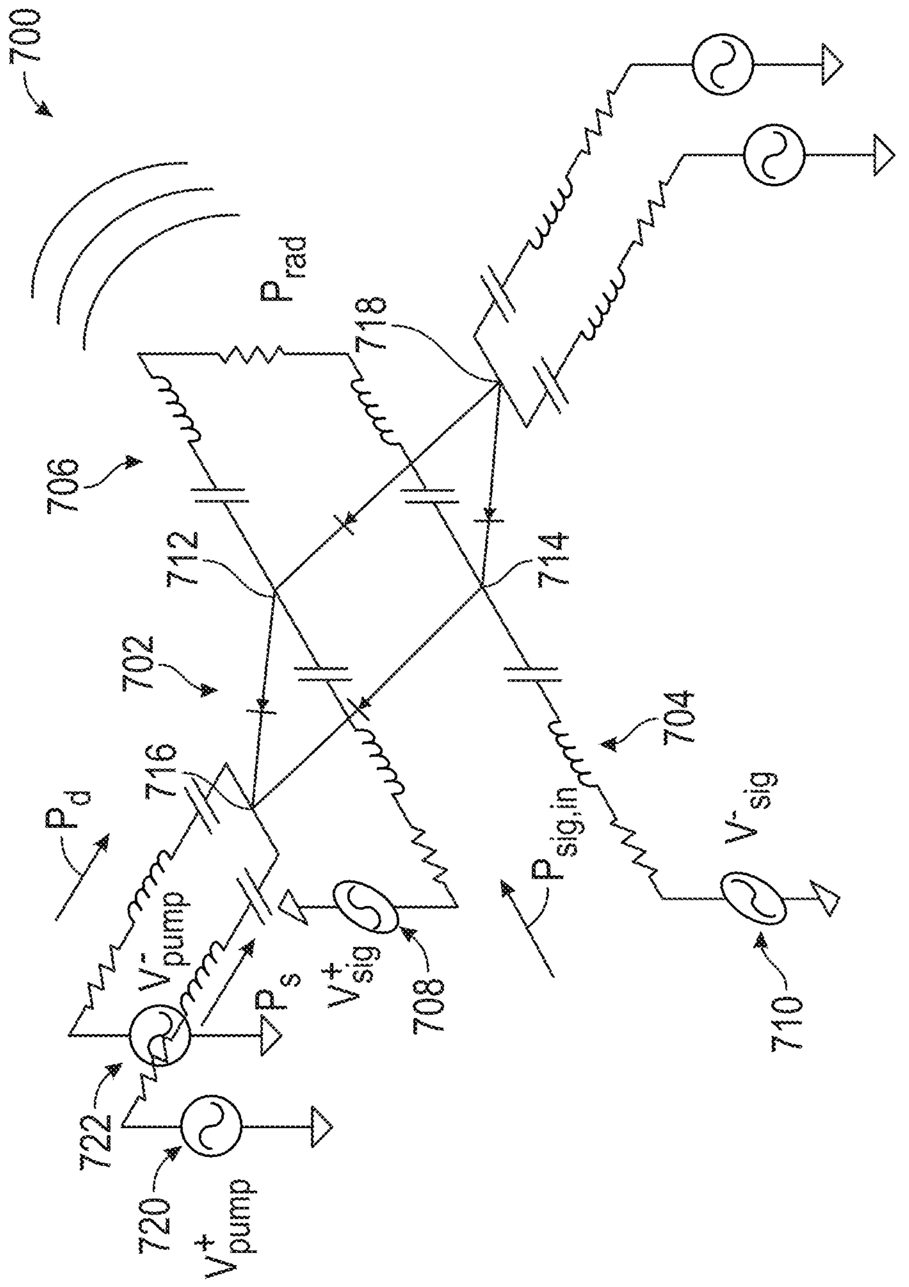
FIG. 7 shows an antenna assembly in an alternative embodiment.

FIG. 7 shows an antenna assembly 700 in an alternative embodiment. The antenna assembly 700 includes a coupling element 702 that controls an electrical connection between a drive circuit 704 and an ESA 706. The coupling element 702 is a diode rectifier bridge. The drive circuit 704 includes a positive signal input 708 ($V^{+}_{sig}$) and a negative signal input 710 ($V_{sig}$).

The diode rectifier bridge includes four nodes and four sides connecting the four nodes, each side having a diode thereon. The diode(s) can be a varactor (i.e., a diode whose internal capacitance changes with respect to a reverse voltage applied thereto). The nodes include a first signal node 712, a second signal node 714, a first modulation node 716 and second modulation node 718. The positive signal input 708 is supplied to the first signal node 712 and the negative signal input 710 is supplied to the second signal node 714. The ESA 706 is connected across the first signal node 712 and the second signal node 714. A first modulator 720 ($V^{+}_{pump}$) provides the summation signal ($P_s$) (i.e., the first tonal signal) into the diode rectifier bridge at the first modulation node 716 and the second modulator 722 ($V^{-}_{pump}$) provides the difference signal ($P_d$) (i.e., the second tonal signal) into the diode rectifier bridge at the first modulation node 716. The second modulation node 718 leads to ground for the RF signal. A voltage bias can be applied to the diodes (varactors) so that they operate in a reverse biased region. The reverse bias reduces loss and noise in the RF signal and improves signal linearity. In general, a DC voltage bias can be applied across the modulation nodes, with a positive voltage value and the first modulation node 716 and a negative voltage value at the second modulation node 718.

Returning to FIG. 6, the saturation power can be increased when the antenna assembly 700 of FIG. 7 is being used by stacking multiple varactors and\or by increasing a voltage bias across one or more varactors.

Figure 8:
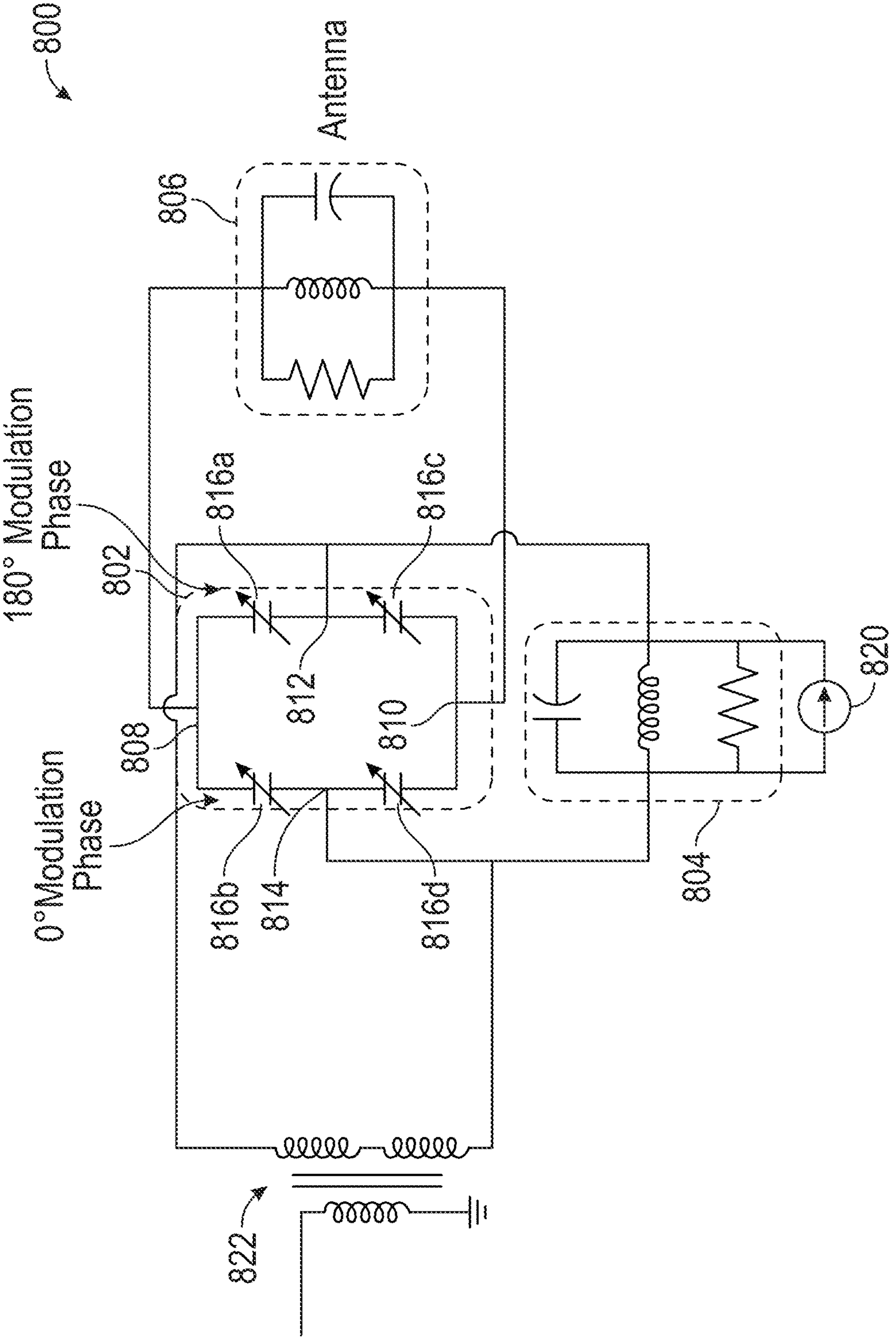
FIG. 8 shows an antenna assembly in another alternative embodiment.

FIG. 8 shows an antenna assembly 800 in another alternative embodiment. The antenna assembly 800 includes a coupling element 802 that controls an electrical connection between the drive circuit 804 and an ESA 806. The coupling element 802 is a variable capacitor rectifier, which is similar to the diode rectifier bridge of FIG. 7 with variable capacitors instead of diodes.

The variable capacitor rectifier includes a first antenna node 808, a second antenna node 810, a first modulation node 812 and a second modulation node 814. A first variable capacitor 816*a* is between the first antenna node 808 and the first modulation node 812. A second variable capacitor 816*b* is between the first antenna node 808 and the second modulation node 814. A third variable capacitor 816*c* is between the first modulation node 812 and the second antenna node 810. A fourth variable capacitor 816*d* is between the second antenna node 810 and the second modulation node 814. The first variable capacitor 816*a* and the fourth variable capacitor 816*d* are operated in phase with each other. The second variable capacitor 816*b* and the third variable capacitor 816*c* are operated in phase with each other and 180 degrees out of phase with the first variable capacitor 816*a* and the fourth variable capacitor 816*d*.

A positive terminal of a signal source 820 is connected to the first modulation node 812 and a negative terminal of the signal source is connected to the second modulation node 814. The ESA 806 is connected across the first antenna node 808 and the second antenna node 810. A signal modulator 822 provides a first tonal signal (sum) and a second tonal signal (difference) across the first modulation node 812 and the second modulation node 814.

Figure 9:
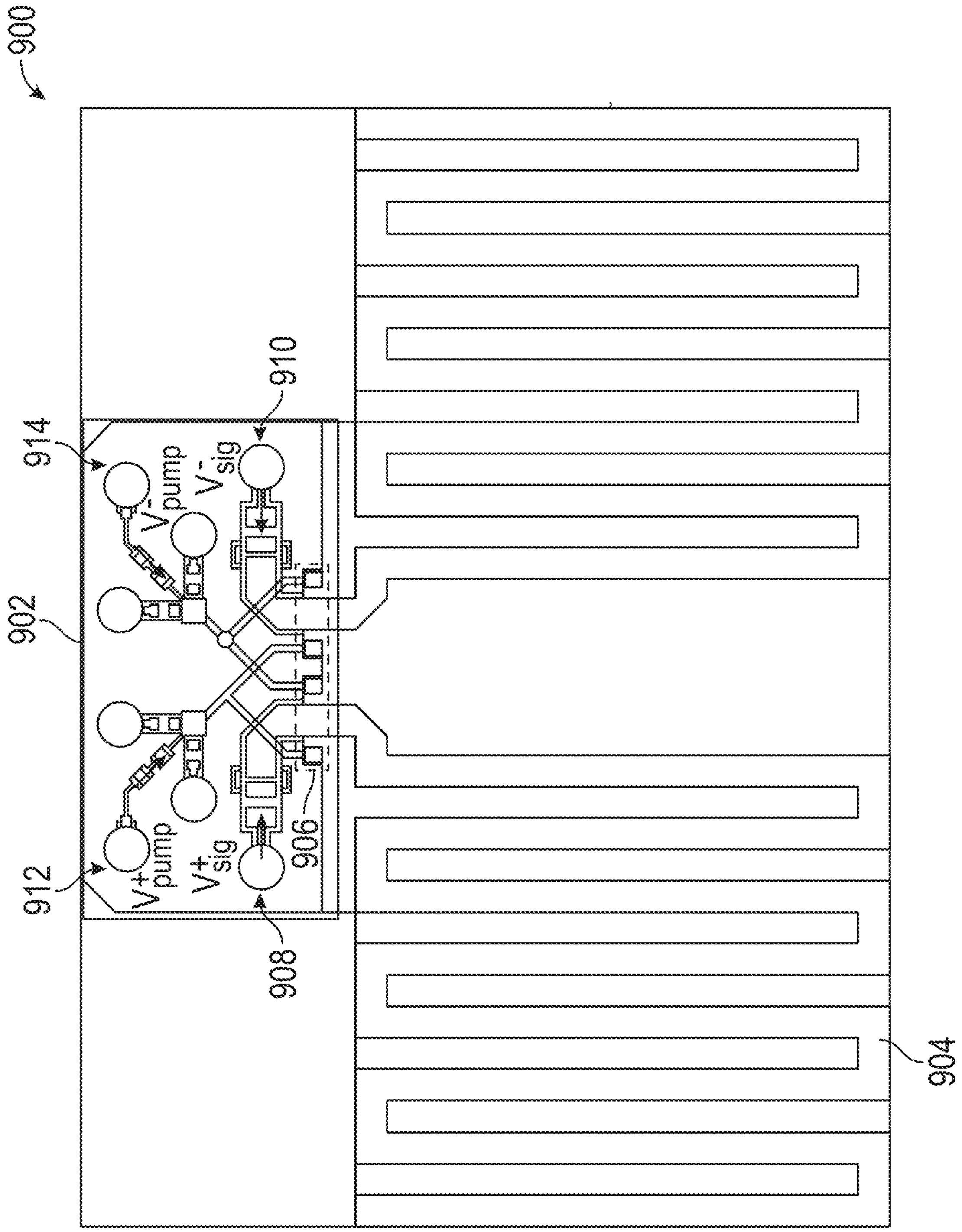
FIG. 9 shows an integrated circuit board that includes the antenna assembly.

FIG. 9 shows an integrated circuit board 900 that includes the antenna assembly. The drive circuit 902, ESA 904 and coupling element 906 are elements of the integrated circuit board 900. The drive circuit 902 includes the positive signal 908 ($V^{+}_{sig}$), the negative signal 910 ($V^{-}_{sig}$), the first modulator 912 ($V^{+}_{pump}$), and the second modulator 914 ($V^{-}_{pump}$).

Figure 10:
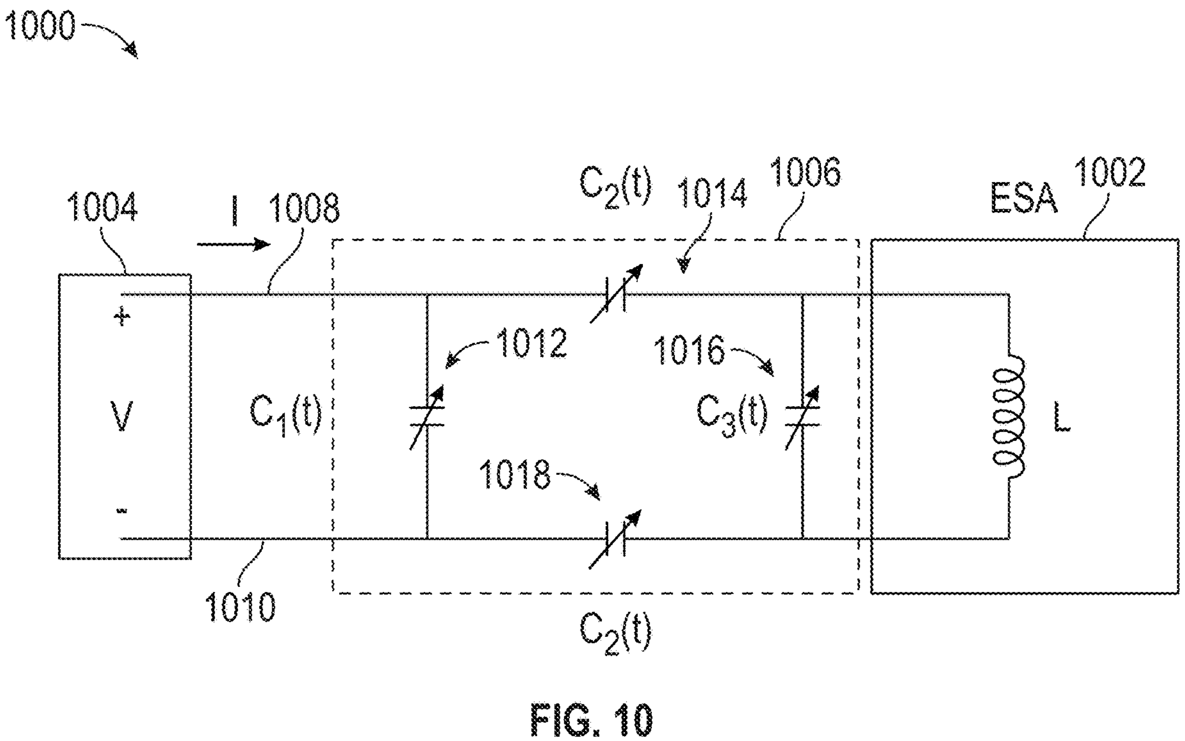
FIG. 10 is a multi-frequency modulation circuit for the antenna assembly, in an illustrative embodiment.

FIG. 10 is a multi-frequency modulation circuit 1000 for the antenna assembly, in an illustrative embodiment. The multi-frequency modulation circuit 1000 includes an electrically small antenna (ESA 1002), a drive circuit 1004, and a modulation circuit or variable coupling element 1006 that electrically couples the drive circuit 1004 to the ESA 1002.

The variable coupling element 1006 connects to the driver circuit 1004 to the driver circuit 1004 via a positive voltage line 1008 and a negative voltage line 1010. The variable coupling element 1006 includes a four variable capacitors. A first variable capacitor 1012 and a third variable capacitor 1016 both extend from the positive voltage line 108 to the negative voltage line 1012. A second variable capacitor 1014 extends from the first variable capacitor 1012 to the third variable capacitor 1016 along the positive voltage line 1008, and a fourth variable capacitor 1018 extends from variable capacitor 1012 to the third variable capacitor 1016 along the negative voltage line 1010. The second variable capacitor 1014 and the fourth variable capacitor 1018 can have a same capacitance or can be operated in the same manner.

The first variable capacitor 1012 is operated using a modulation producing a time-evolution of its capacitance is described in Eq. (6):

$$C_1(t) = 2\frac{a - c(t)}{ad - c^2(t)} \approx \sum c_{1n}\cos(\omega_n t) \quad \text{Eq. (6)}$$

The second variable capacitor 1014 and the fourth variable capacitor 1018 are operated using a modulation producing a time-evolution of their capacitance is described in Eq. (7):

$$C_2(t) = 2\frac{c(t)}{ad - c^2(t)} \approx \sum c_{2n}\cos(\omega_n t) \quad \text{Eq. (7)}$$

The third variable capacitor 1016 is operated using a modulation producing a time-evolution of its capacitance is described in Eq. (7):

$$C_3(t) = 2\frac{d - c(t)}{ad - c^2(t)} \approx \sum c_{3n}\cos(\omega_n t) \quad \text{Eq. (8)}$$

Parameters a and d can be controlled or preselected. For Eqs. (6)-(8), the variable c(t) is given as shown in Eq. (9):

$$c(t) = c_0 + 2c_1\cos(\Omega t + \phi) \quad \text{Eq. (9)}$$

where $c_0$ can $c_1$ can be controlled or preselected. The phases $\phi$ of the capacitors can be separated by 90 degrees. While four capacitors are shown, a variable coupling element having more than four capacitors can also be used to provide multi-frequency modulation.

Figure 11:
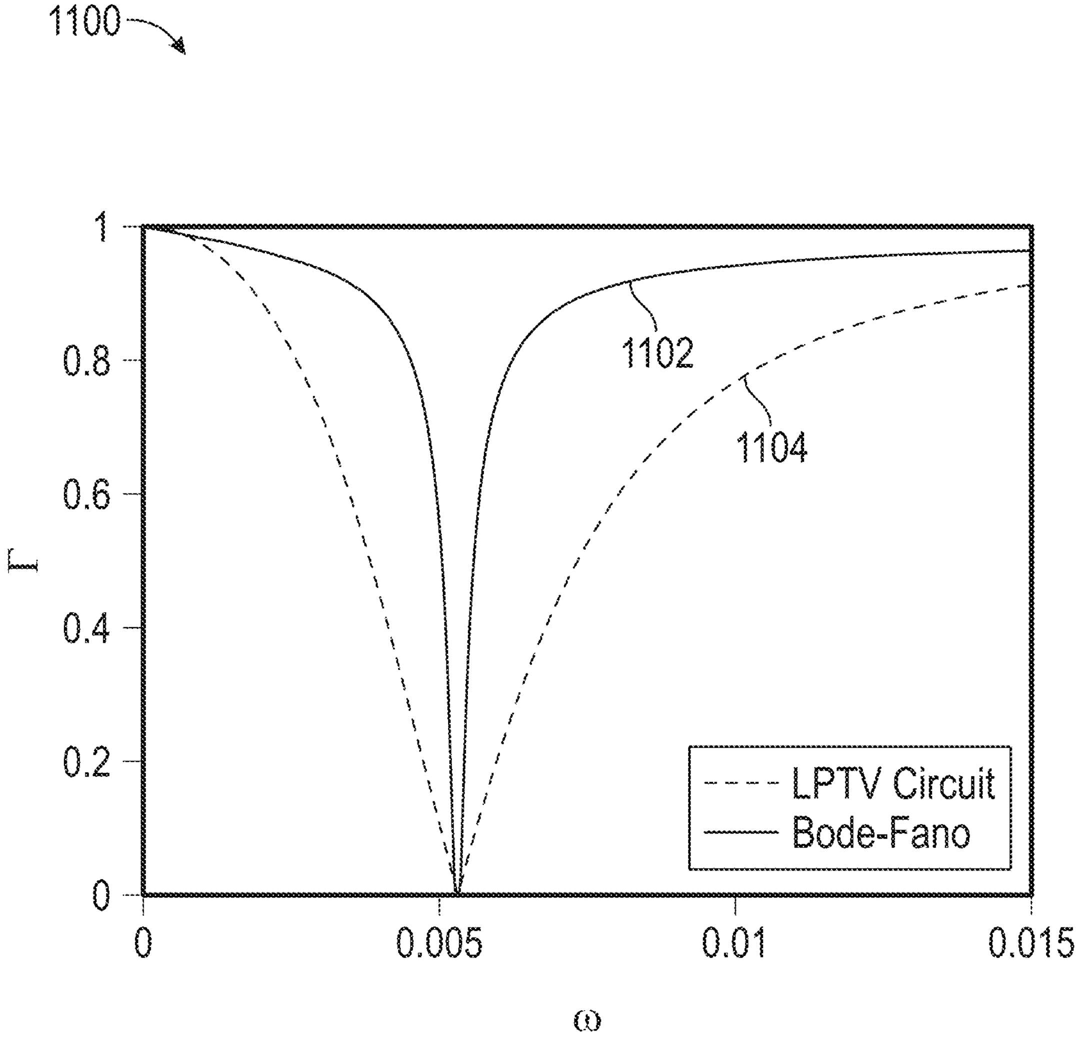
FIG. 11 is a graph of input return loss for the multi-frequency modulation circuit of FIG. 10.

FIG. 11 is a graph 1100 of input return loss for the multi-frequency modulation circuit 1000 of FIG. 10. For graph 110, the parameters are as given in Eqs. (10)-(13):

$$a = d = 1 \quad \text{Eq. (10)}$$

$$c_0 = a/2 \quad \text{Eq. (11)}$$

$$c_1 = 0.9c_0/2 \quad \text{Eq. (12)}$$

$$\Omega = 0.95 \quad \text{Eq. (13)}$$

The graph 1100 shown a first curve 1102 representing g a Bode Fano-limit and a second curve 1104 representing the input return loss for an antenna assembly operating with the variable coupling element 1006. The graph 1100 shows that complex modulation is possible with matching that extends beyond the Bode-Fano limit.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form detailed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the various embodiments with various modifications as are suited to the particular use contemplated.

While the preferred embodiments have been described, it will be understood that those skilled in the art, both now and in the future, may make various improvements and enhancements which fall within the scope of the claims which follow. These claims should be construed to maintain the proper protection for the disclosure as first described.

What is claimed is:

1. An antenna assembly, comprising:
an electrically small antenna (ESA);
a drive circuit for operating the ESA, the drive circuit including a resonator having a first resonant frequency;
a variable coupling element that controls an electrical connection between the drive circuit and the ESA;
a first modulator configured to modulate the variable coupling element at a first tonal frequency, wherein the first tonal frequency is a sum of the first resonant frequency and a second resonant frequency of the ESA; and
a second modulator configured to modulate the variable coupling element at a second tonal frequency, wherein the second tonal frequency is a difference between the first resonant frequency and the second resonant frequency.

2. The antenna assembly of claim 1, wherein the variable coupling element is modulated simultaneously by the first modulator and the second modulator.

3. The antenna assembly of claim 1, wherein the resonator is an RLC circuit and the first resonant frequency is a resonant frequency of the RLC circuit.

4. The antenna assembly of claim 3, wherein the drive circuit further includes an input/output device in parallel with the resonator.

5. The antenna assembly of claim 1, wherein the variable coupling element is one of: (i) a variable capacitor; and (ii) a varactor.

6. The antenna assembly of claim 1, wherein the variable coupling element is one of: (i) a diode rectifier bridge; and (ii) and variable capacitor rectifier bridge.

7. The antenna assembly of claim 1, wherein the drive circuit, the ESA, the variable coupling element, the first modulator, and the second modulator are elements of an integrated circuit board.

8. The antenna assembly of claim 1, wherein the variable coupling element further comprises four variable capacitors.

9. The method of claim 1, wherein the variable coupling element includes four capacitors, further comprising controlling the variable coupling element using three or more independent modulations signals.

10. A device, comprising:
an electrically small antenna (ESA);
a drive circuit for operating the ESA, the drive circuit including a resonator having a first resonant frequency;
a variable coupling element that controls an electrical connection between the drive circuit and the ESA;
a first modulator configured to modulate the variable coupling element at a first tonal frequency, wherein the first tonal frequency is a sum of the first resonant frequency and a second resonant frequency of the ESA; and
a second modulator configured to modulate the variable coupling element at a second tonal frequency, wherein the second tonal frequency is a difference between the first resonant frequency and the second resonant frequency.

11. The device of claim 10, wherein the variable coupling element is modulated simultaneously by the first modulator and the second modulator.

12. The device of claim 10, wherein the resonator is an RLC circuit and the first resonant frequency is a resonant frequency of the RLC circuit.

13. The device of claim 10, wherein the variable coupling element is one of: (i) a variable capacitor; and (ii) a varactor.

14. The device of claim 10, wherein the variable coupling element is one of: (i) a diode rectifier bridge; and (ii) and variable capacitor rectifier bridge.

15. The device of claim 10, wherein the drive circuit, the ESA, the variable coupling element, the first modulator, and the second modulator are elements of an integrated circuit board.

16. The device of claim 10, wherein the device is one of: (i) an aerial device; (ii) an unmanned aerial vehicle; (iii) a guided missile; and (iv) a satellite orbiting the earth.

17. A method of operating an electrically small antenna, comprising:
controlling an electrical connection between the electrically small antenna and a drive circuit via a variable coupling element, the drive circuit including a resonator having a first resonant frequency, wherein controlling the electrical connection comprises:
modulating the variable coupling element at a first tonal frequency via a first modulator, wherein the first tonal frequency is a sum of the first resonant frequency and a second resonant frequency of the ESA; and
modulating the variable coupling element at a second tonal frequency via a second modulator, wherein the second tonal frequency is a difference the first resonant frequency and the second resonant frequency of the ESA.

18. The method of claim 17, further comprising modulating the variable coupling element simultaneously at the first tonal frequency and the second tonal frequency.

19. The method of claim 17, wherein the resonator is an RLC circuit and the first resonant frequency is a resonant frequency of the RLC circuit.

20. The method of claim 17, wherein the variable coupling element is one of: (i) a diode rectifier bridge; and (ii) and variable capacitor rectifier bridge.

* * * * *